United States Patent

Bolle

[11] Patent Number: 5,940,406
[45] Date of Patent: Aug. 17, 1999

[54] METHOD OF DIGITAL FREQUENCY CORRECTION IN MULTICARRIER TRANSMISSION PROCESSES

[75] Inventor: Michael Bolle, Hildesheim, Germany

[73] Assignee: Robert Bosch GmbH, Stuttgart, Germany

[21] Appl. No.: 08/666,548

[22] PCT Filed: Nov. 8, 1995

[86] PCT No.: PCT/DE95/01541

§ 371 Date: Jun. 20, 1996

§ 102(e) Date: Jun. 20, 1996

[87] PCT Pub. No.: WO96/16493

PCT Pub. Date: May 30, 1996

[30] Foreign Application Priority Data

Nov. 23, 1994 [DE] Germany .............................. 44 41 566

[51] Int. Cl.⁶ .................................................. H04J 11/00
[52] U.S. Cl. ....................... 370/484; 370/210; 370/203; 375/260
[58] Field of Search .............................. 364/576, 726.01, 364/726.02, 726.03; 370/210, 480, 481, 482, 484, 203; 375/260, 326, 344

[56] References Cited

U.S. PATENT DOCUMENTS

| 5,345,440 | 9/1994 | Gledhil et al. | 370/210 |
| 5,371,761 | 12/1994 | Daffara et al. | 375/200 |
| 5,377,232 | 12/1994 | Davidov et al. | 375/106 |
| 5,550,812 | 8/1996 | Philips | 370/203 |
| 5,627,863 | 5/1997 | Aslanis | 375/260 |

*Primary Examiner*—Chau Nguyen
*Assistant Examiner*—Kenneth Vanderpuye
*Attorney, Agent, or Firm*—Michael J. Striker

[57] ABSTRACT

A method is proposed that is used for frequency correction in multicarrier processes. A received signal is shifted by means of a predetermined frequency into the base band and then subjected to a modified Fourier transform. From the Fourier transformed signal, a measurement variable is ascertained that is proportional to the frequency deviation between the predetermined frequency and the frequency of the carrier signal. This measurement variable is taken into account in the Fourier transform and thus the frequency deviation is compensated for.

5 Claims, 2 Drawing Sheets

METHOD OF DIGITAL FREQUENCY CORRECTION IN MULTICARRIER TRANSMISSION PROCESSES

BACKGROUND OF THE INVENTION

The invention is based on a method of frequency correction in multicarrier transmission processes and, more particularly, to a method of frequency correction in multicarrier transmission processes, in which a multicarrier signal is subjected to bandpass filtering and then, via a frequency mixture with a predetermined frequency, shifted into a bandpass range, whereupon a discrete Fourier transform is carried out, and the Fourier-transformed signal is then subjected to a channel decoding, wherein from the Fourier transformed signal a frequency deviation is determined between a carrier signal and the frequency that is used for the frequency mixture. U.S. Pat. No. 5,228,025 has already disclosed a method for frequency correction in multicarrier transmission processes in which the received signal is bandpass-filtered and then, via a mixture having a predetermined oscillator frequency, frequency-shifted into the base band, then filtered and digitally converted. The digital signal is then subjected to a digital Fourier transformation and is output for further decoding. An accurate Fourier transform requires accurate knowledge of the transmission frequency with which the carrier signal is sent, so that the oscillator frequency can be tuned to it. The signal output by the digital Fourier transform is investigated for deviation of the carrier frequency of the carrier signal relative to the predetermined oscillator frequency, and control values are ascertained with the aid of which an automatic frequency correction of the oscillator is performed. In this way, a detectable frequency deviation in the evaluated signal between the frequency of the carrier signal and the frequency of the oscillator is corrected by the readjustment of the oscillator.

SUMMARY OF THE INVENTION

In the method for frequency correction in a multicarrier transmission process according to the invention, a multicarrier signal is subjected to bandpass filtering and then, via a frequency mixture with a predetermined frequency, shifted into a bandpass range, whereupon a discrete Fourier transform is carried out, and the Fourier-transformed signal is then subjected to a channel decoding, wherein from the Fourier transformed signal a frequency deviation is determined between a carrier signal and the frequency that is used for the frequency mixture.

The method according to the invention is characterized in that from the ascertained frequency deviation, values for a modified Fourier transform are calculated in such a way that the frequency deviation between the carrier signal and the frequency that is used for the frequency mixture is compensated for by the modified Fourier transform.

The arrangement according to the invention has the advantage over the prior art that automatic frequency correction of the oscillator frequency is unnecessary; instead, the ascertained frequency shift is taken into account directly in the Fourier transform. In this way, a simple and reliable method is assured for being able to carry out accurate-frequency demodulation in multicarrier transmission processes.

Advantageous further features of and improvements to the method according to the invention are provided in preferred embodiments of the invention. In various preferred embodiments it is especially advantageous to use a fast algorithm to calculate the modified discrete Fourier transform.

A further preferred embodiment of the method of the invention includes a readout of modified rotation factors, stored in memory in a table, from the table. In this way, the required rotation factors can be accessed quickly and without difficulty.

One advantageous application of the method of the invention is to digital radio transmission.

BRIEF DESCRIPTION OF THE DRAWING

One exemplary embodiment of the invention is shown in the drawing and described in further detail in the ensuing description, in which.

DESCRIPTION OF THE PREFERRED EMBODIMENT

Figure 1:
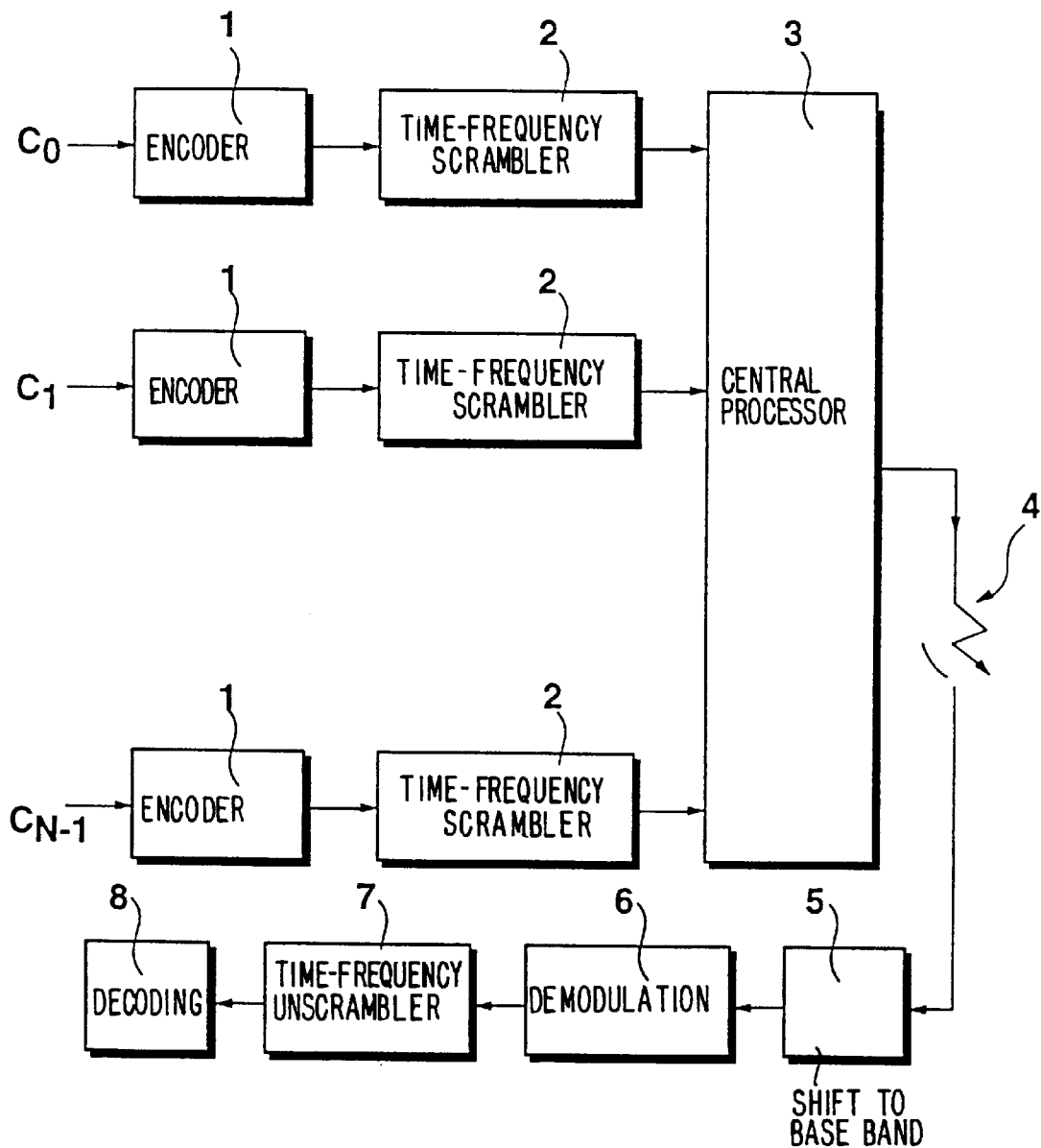
FIG. 1, is a block diagram of a prior art multicarrier transmission process.

FIG. 1 schematically shows a method for transmitting digital data, especially for a radio transmission method with a high bit rate for mobile receivers. This method is carried out for instance in digital audio broadcasting (DAB) by means of a multicarrier transmission process by the orthogonal frequency division multiplexing (OFDM) method. In it, as shown in FIG. 1, a plurality of signal channels $C0, C1, \ldots, Cn-1$ are each sent parallel to a respective convolution encoder 1. The convolution encoder 1 carries out a convolution encoding of the supplied signal. Next, the channels are supplied to a time-frequency scrambling unit 2. The time-frequency scrambling unit carries out a time-frequency scrambling of the supplied signal. By means of the time-frequency scrambling, a statistical independence of the channels is achieved with respect to Raleigh processes and with respect to the channel properties. Next, the signals of the various channels $C0, \ldots, Cn-1$ are subjected, in a central processor 3, to a time-division multiplexing method and carrier modulation by means of the orthogonal frequency division multiplexing (OFDM), method. In this way, a signal is obtained that is chronologically shuffled and that has a plurality of carrier signals of difference frequencies.

In the central processor 3, a synchronization symbol is added to the data transmitted; it makes it possible to ascertain the time, frequency and phase with which the received data are transmitted. This method is known and is described for instance in German Patent Disclosure DE 41 28 713.

The carrier signals are then transmitted to a receiver over a transmission path 4. In the receiver, filtering and shifting into the base band 5, demodulation 6, a time-frequency unscrambling 7, in which in other words the scrambling is undone, and decoding 8 are carried out.

Figure 2:
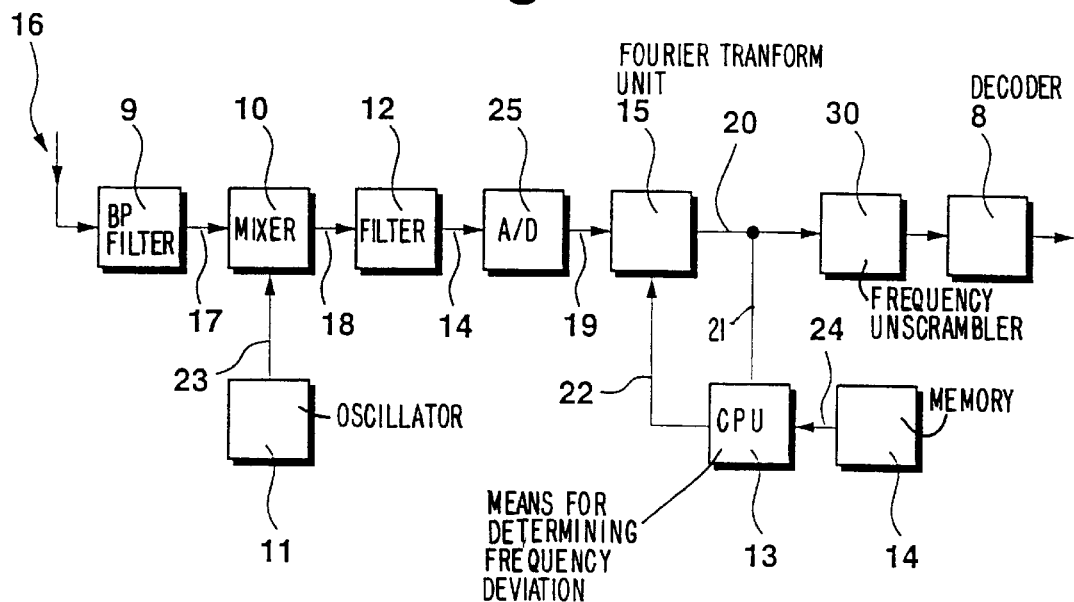
FIG. 2, is a block diagram of a receiver for a multicarrier transmission process according to the invention.

FIG. 2 shows a receiver which in terms of a special exemplary embodiment performs the method of the invention with a digital frequency correction.

An antenna 16 is connected to a bandpass filter 9. The bandpass filter 9 is connected to a mixer 10 over a first signal line 17. A free-wheeling oscillator 11 is coupled to the mixer 10 via a seventh signal line 23. The output of the mixer 10 is connected to one input of a filter 12 over a second signal line 18. The output of the filter 12 is connected to one input of an A/D converter 25 via a third signal line 14. Via a ninth signal line 19, the output of the A/D converter 25 is connected to the input of a Fourier transform unit 15. The output of the Fourier transform unit 15 is connected to one input of a demodulation and time-frequency unscrambling unit 30 via a fourth signal line 20. The output of the demodulation and time-frequency unscrambling unit 30 is carried to the input of a channel decoder 8. A fifth signal line 21 is extended from the fourth signal line 20 to one input of a central processor (CPU) 13. The central processor 13 is connected to a memory 114 over an eighth signal line 24. One output of the central processor 13 is connected to a data input of the Fourier transform unit 15 over a sixth signal line 22. The receiver of FIG. 2 functions as follows:

Via the antenna 16, a signal output by the time-division multiplexing and modulation unit 3 is received and sent on to the bandpass filter 9. The bandpass filter 9 carries out bandpass filtering of the received signal and carries the filtered signal onto the mixer 10. In the mixer 10, the filtered signal is mixed with a frequency specified by the oscillator 11, and the received signal is thus frequency-shifted into the bandpass range at a fixed interval from the mean frequency of the bandpass signal to be sampled. The frequency of the oscillator is approximately equivalent to the carrier frequency with which the signal is transmitted. The frequency-shifted signal is then filtered by the filter 12 and subsequently subjected to an A/D conversion. The digitized signal, which represents a complex base signal, is thereupon subjected digitally in the Fourier transform unit 15 to a demodulation process in the form of a Fourier transform, in which from the received signal, which has a plurality of carrier signals, a carrier signal having a predetermined carrier frequency is filtered out. In accordance with the time-division multiplexing method used in the time-division multiplexing unit 3, in the form of a time slot, the symbols of the carrier signal that is to be decoded are observed. Each symbol is subjected to a Fourier transform. The Fourier-transformed signals are subjected to demodulation, and the time-frequency scrambling is undone. Next, by a channel decoder 8, which is preferably embodied as a soft Viterbi decoder, the signals are channel-decoded and output. The Fourier transformed carried signals are simultaneously supplied to a central processor 13. The central processor 13, by checking the synchronization symbol, ascertains a frequency deviation $\Delta f$ between the carrier signal and the specified oscillator frequency, with which the received signals are frequency-shifted by the mixer 10. From the frequency deviation $\Delta f$, rotation factors are calculated that are supplied to the Fourier transform unit 15. The Fourier transform unit 15 takes the new rotation factors into account in further Fourier transforms. To ascertain the frequency deviation, other methods may be used instead.

The discrete Fourier transform and the action of the rotation factors will be described in further detail below in conjunction with FIG. 2. The discrete Fourier transform (DFT) of a sequence $X_k$ of length N, where N is a fixed constant and k and l are running variables that range from 0 to N-1, is represented by the following equation:

$$X_l = \sum_{k=0}^{N-1} x_k \exp(-j2\pi kl/N), \quad l = 0, \ldots, N-1. \quad (1)$$

The calculation of the DFT in accordance with formula 1 represents the demodulation process in a multicarrier transmission process in the event that the subcarrier intervals of all the carrier signals are the same and that a rectangular transmission pulse is used. This is true particularly for the orthogonal frequency division multiplexing method, which has been described for instance in Alard, "Principles of Modulation and Channel Coding for Digital Broadcasting for Mobile Receivers", EBU Technical Review 224, pp. 168–189, 1987.

To achieve a final control element for frequency control requires the modulation of the complex base bond signal, which is described by the sampled values $x_k$.

For the modulation, a complex oscillator signal s is used, which is described the sampled values $s_k$.

$$s_k = \exp(-j2\pi\rho k/N), \quad k = 0, \ldots, N-1. \quad (2)$$

Here, rho represents the standardized frequency deviation, where rho=$N\Delta f/F_c$, in which $\Delta f$ represents the frequency deviation of the oscillator 11 compared with the carrier frequency of the received signal. The running variable k ranges from 0 to N-1; N is a fixed constant. $F_c$ is the sampling rate in the complex base band, or in other words the sampling range of the A/D converter 25. The frequency deviation $\Delta f$ is obtained in the receiver by evaluating the synchronization signal. The sampled values of the frequency-corrected base band signal are designated as $x^*_K$ and are obtained in accordance with the above formulas by using $x^*_k = s_k \cdot x_k$.

The fundamental concept of the method of the invention is to combine the frequency correction with the calculation of the discrete Fourier transform. The initial values of the thus-modified discrete Fourier transform are then $$\tilde{X}_l = \sum_{k=0}^{N-1} x_k \exp(-j2\pi(l+\rho)k/N), \quad l = 0, \ldots, N-1. \quad (3)$$

in which l is a running variable that ranges from 0 to N-1. If the abbreviation $$W_N = \exp(-j2\pi/N) \quad (4)$$

for rotation factors of the discrete Fourier transform is used, then formula 3 can be written as follows:

$$\tilde{X}_l = \sum_{k=0}^{N-1} x_k W_N^{(l+\rho)k}, \quad l = 0, \ldots, N-1. \quad (5)$$

The modified discrete Fourier transform, which is required to carry out the frequency correction, is accordingly distinguished from the original discrete Fourier transform only in the selection of the rotation factors.

Preferably, instead of the discrete Fourier transform shown in formula 1, fast algorithms are used. Fast algorithms that are also suitable for the modified discrete Fourier transform are indicated below.

The example of the radix 2 fast Fourier transform will be considered. In principle, these considerations may also be applied to other fast algorithms to calculate the fast Fourier transform. To use a radix 2 algorithm, it is necessary for N to be a power of 2; that is, the relationship n=ld N applied for all elements of N, where ld designates the logarithm for base 2. In that case, formula 5 can then be represented as follows:

$$\tilde{X}_l = \sum_{k=0}^{N'-1} x_{2k} W_{N'}^{(l+\rho)k} + W_N^{l+\rho} \sum_{k=0}^{N'-1} x_{2k+1} W_{N'}^{(l+\rho)k}, \quad (6)$$

$$l = 0, \ldots, N'-1$$

Here for the sake of abbreviation, $N'=N/2$ has been used. The remaining carrier amplitudes $X_l$ for $l=N', \ldots, N-1$ can be ascertained from the partial sums already calculated in formula 6 by means of the following equation:

$$\tilde{X}_{N'+l} = \sum_{k=0}^{N'-1} x_{2k} W_{N'}^{(l+\rho)k} - W_N^{l+\rho} \sum_{k=0}^{N'-1} x_{2k+1} W_{N'}^{(l+\rho)k}, \quad (7)$$

$$l = 0, \ldots, N'-1.$$

Equations 6 and 7 represent the foundations for fast calculation of the modified discrete Fourier transform. By repeatedly using these relations, the modified discrete Fourier transform of length N can be traced back to elementary functions, so-called butterflies, for the modified discrete Fourier transform of length 2.

Suitable algorithms are described, for instance in Brigham, "FFT—Schnelle Fouriertransformation" [FFT—Fast Fourier Transform], Oldenbourg, Munich and Vienna, 1987, as decimation-in-time algorithms. The difference resides solely in the different choice of the rotation factors used. This has the great advantage that known hardware for achieving the fast Fourier transform can be used directly, on the condition that access to the rotation factors stored in memory is possible.

An efficient determination of the N-1 rotation factors of the modified discrete Fourier transform will be described below. To calculate a modified discrete Fourier transform of length N, N-1 different rotation factors are necessary, which are obtained by the following relationship:

$$W_N^{(l+\rho)2^m} \text{ for } m = 0, \ldots, n-1 \text{ and } l = 0, \ldots, 2^{n-m-1}-1. \quad (8)$$

In this formula, m is a running variable. Since the rotation factors are unimodular, they can also be represented by corresponding phase angles θ:

$$W_N^{(l+\rho)2^m} = \exp(-j\theta_{l,m}) \text{ with } \theta_{l,m} = \frac{2\pi}{N} 2^m (l+\rho). \quad (9)$$

The various angles can be efficiently calculated by the following recursion equations:

$$\theta_{l,m} = 2^m \theta_{l,0} \quad (10)$$

$$\theta_{l+1,0} = \theta_{l,0} + 2\pi/N \mod 2\pi \quad (11)$$

$$\theta_{0,0} = 2\pi\rho/N \quad (12)$$

Figure 3:
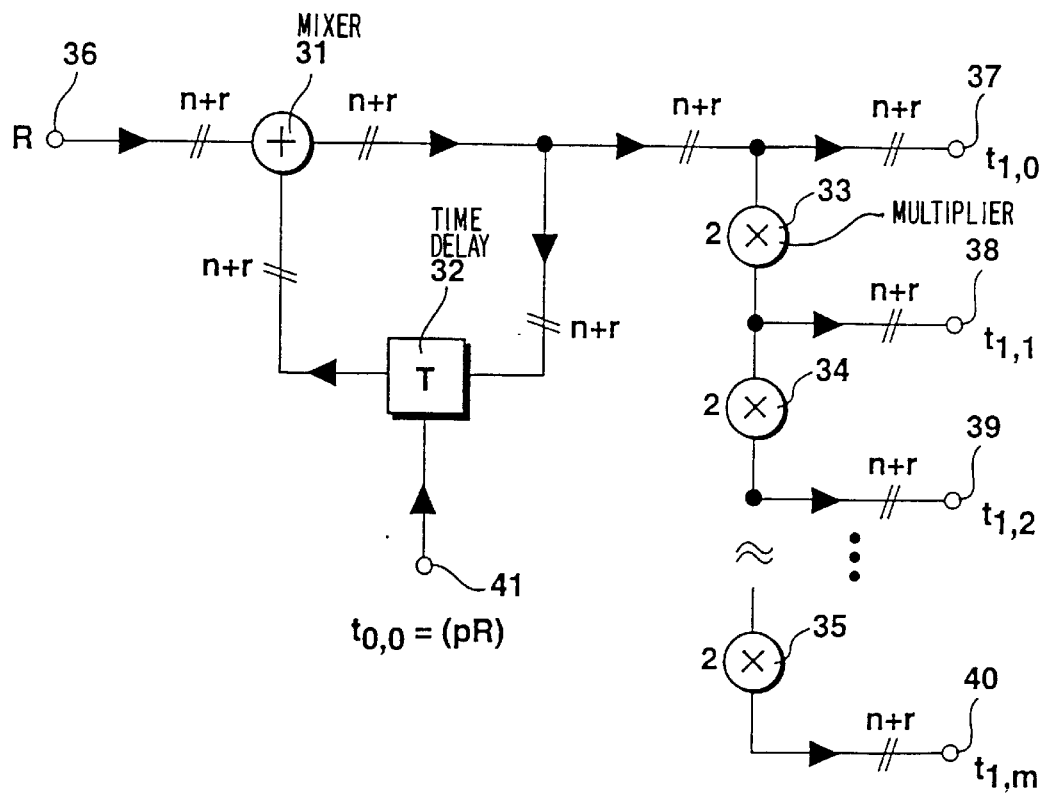
FIG. 3, is a schematic diagram of a schematic illustration of the method for ascertaining rotation factors.

If the modified discrete Fourier transform is realized in a fixed decimal format, then the standardized frequency deviations must be adapted to that format. If one assumes that to achieve the frequency correction a number R of quantizing stages between two carrier signals is adequate, then a word width of $r=\text{ld}R$ bits is needed to represent these intermediate stages. The number R is intended to be a power of 2. If the above-indicated phase angles θ are mapped to integers in accordance with the relationship $t=NR\theta/2\pi$, then the following recursion prescription is obtained:

$$t_{l,m} = 2^m t_{l,0} \quad (14)$$

$$t_{l+1,0} = t_{l,0} + R \mod NR \quad (15)$$

$$t_{0,0} = [\rho R] \quad (16)$$

in which the square braces represent rounding off to the closest integral value. One realization of these equations by means of an accumulator n+r bits wide is shown in FIG. 3. A value R is supplied to an input 36 and passed on to an adder 31. The adder adds the value R supplied by the input 36 to a value supplied by a delay member 32. The output of the adder 31 is connected to the input of the delay member 32. Moreover, the output of the adder 31 is carried to a first output channel 37 and to one input of a first multiplier 33. The output of the first multiplier 33 is connected to one input of a second multiplier 34 and to a second output channel 38. The output of the second multiplier 34 is connected to a third output channel 39 and to a further multiplier. The $m^{th}$ multiplier 35 is connected to an $(m+1)^{th}$ output channel 40. A second input 41 of the time delay member 32 is occupied with a starting value. The first, second, . . . , and $m^{th}$ multipliers 33, 34 and 35 each carry out one multiplication by the value 2. The circuit shown in FIG. 3 is applied to data words n+r in length. The time delay member 32 performs a time delay by a time cycle T with which the adder 31 and the multipliers 33, 34, 35 are clocked. An initialization 41 of the accumulator is done with the value [rhoR]. It can be seen that the frequency deviation is involved solely in this initialization. In order to generate all the values required, the phase accumulator must pass through N/2 cycles. Multiplications by 2 can be accomplished in the form of simple bit shift operations. In the next processing step, the words t, whose width is n+r bits, of the output channels 37, 38, 39, 40 are converted to a word length l by cutting off the n+r-l less-significant bits. The corresponding values are designated as t below and are used to address a table of values for cosine and sine functions. The value range of t is $0, \ldots, 2^{v-1}$. The modified rotation factors are obtained from the values of t by means of $$W_N^{(l+\rho)2^m} = \cos(2\pi \tilde{t}_{l,m}/2^v) - j\sin(2\pi \tilde{t}_{l,m}/2^v), \quad (17)$$

so that formula 17 represents a calculation prescription for the table values as a function of the addresses t. The values of the sine and cosine functions are stored in the memory 14 with a word length w that is intended to match the signal word length. The address word length l should be greater than w. Good results are obtained with v=w+4. In this form of the realization, $2^{v+1}$ values of word length w are needed for the table. By utilizing the symmetries of the sine and cosine functions, the number of table entries can be reduced to two $2^{v-1}$ values, as shown below. First:

$$\sin(\theta) = \cos(\theta - \pi/2), \quad (18)$$

so that $$\sin(2\pi \tilde{t}_{l,m}/2^v) = \cos(2\pi(\tilde{t}_{l,m} - 2^{v-2})/2^v \quad (19)$$

Also, $$\cos(\theta - \pi) = -\cos(\theta) \quad (20)$$

and hence $$\cos(2\pi \tilde{t}_{l,m}/2^v) = -\cos(2\pi(\tilde{t}_{l,m}-2^{v-1})/2^v). \quad (21)$$

By means of this arrangement, the overall result attained is that only a single table of cosine functions with $2^{v-1}$ values of word length w is needed. The cosine functions are stored in a memory 14 and are called up by the central processor 13 by way of the t values, which represent the addresses of the associated cosine values. The addresses are ascertained in a simple way with the aid of the method illustrated in FIG. 3, using the accumulator. In this way, the rotation factors needed can be found very quickly.

The method of the invention is preferably used in receiving a digital radio program (DAB).

I claim:

1. A method for frequency correction in a multicarrier transmission process, wherein a multicarrier signal is subjected to bandpass filtering and then, via a frequency mixture with a predetermined frequency, shifted into a bandpass range, whereupon a discrete Fourier transform is carried out, and the Fourier-transformed signal is then subjected to a channel decoding, wherein from the Fourier-transformed signal a frequency deviation is ascertained between a carrier signal and the frequency that is used for the frequency mixture, characterized in that from the ascertained frequency deviation, values for a modified Fourier transform are calculated in such a way that the frequency deviation between the carrier signal and the frequency that is used for the frequency mixture is compensated for by the modified Fourier transform.

2. The method of claim 1, characterized in that a fast algorithm is used to calculate the modified Fourier transform.

3. The method of claim 1, characterized in that the values for modifying the Fourier transform are retrieved from a table.

4. The method of claim 3, characterized in that addresses at which the values are stored in memory in the table are ascertained with the aid of an accumulator.

5. The method of one of claim 1, characterized in that the frequency correction by means of the modified Fourier transform is used in reception of a digital radio.

* * * * *